United States Patent Office 3,320,449
Patented May 16, 1967

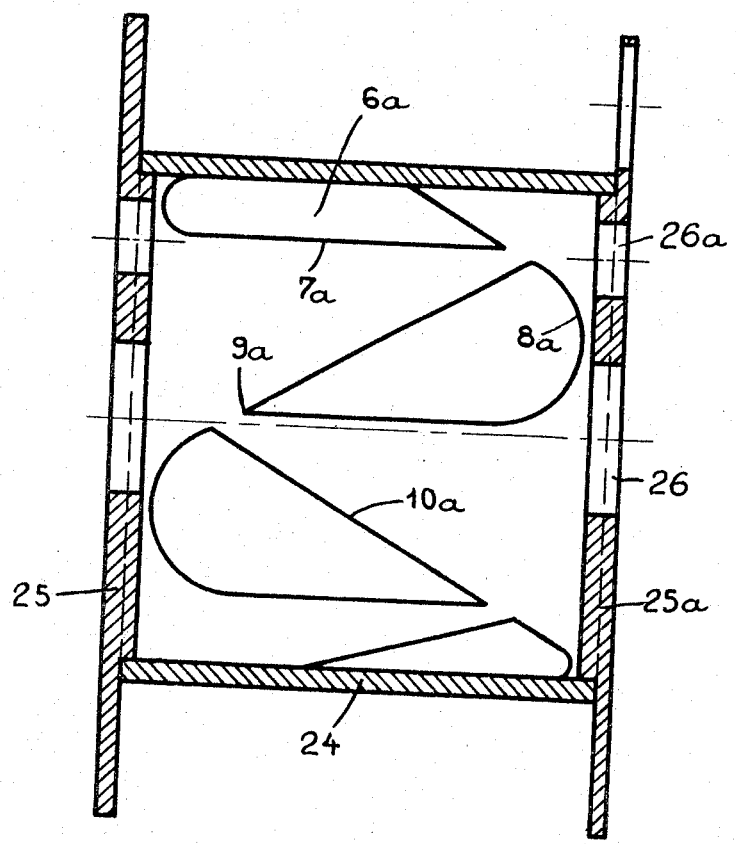

3,320,449
ON-LOAD SELF-STARTING SYNCHRONOUS MOTOR
Jacques Roger Oscar Delaloye, Villa Beauregard, Blvd. Beausite, Cannes, France
Filed Jan. 18, 1965, Ser. No. 426,061
Claims priority, application France, Jan. 23, 1964, 961,281, Patent 1,391,124; Nov. 30, 1964, 996,756, Patent 86,890
12 Claims. (Cl. 310—156)

This invention relates to an on-load self-starting synchronous motor.

It is already known to utilize on-load self-starting synchronous motors comprising a rotor consisting of a toroidal permanent magnet having alternating north and south poles along its perimeter and a stator with at least one circular winding into which fits an asymmetrical magnetic core forming a pole-piece.

In such motors, the stator impedance and the differences in reluctance between the poles is relatively large, resulting in relatively low efficiency.

The present invention has for object to overcome these drawbacks and to accordingly provide an on-load self-starting synchronous motor of the kind specified hereinabove, characterized in that its asymmetrical magnetic core comprises a tubular part having on its cylindrical wall a series of identical, successively inverted, scalene right-angle triangle-shaped openings of which the longer of the two sides including the right angle is parallel with the motor shaft and has a length substantially equal to the width of the rotor, each triangle terminating in a circular arcuate portion opposite its acutest corner, which portion is positioned close to the hypotenuse of the adjacent triangle, and a non-return system being interposed between the stator and the rotor in order to permit motor rotation in a determinate direction only.

A magnetic core as hereinbefore disclosed permits of eliminating all play when mounting the core, of ensuring relatively small differences in reluctance between the poles, and lastly of substantially reducing the stator impedance.

In one specific form of embodiment, the tubular part is a hollow cylindrical part closed by a cover.

In another constructional form, the tubular part is closed at its extremities by two covers projecting therefrom and contacting a mild steel tube forming the inner wall of the motor cowl and helping to reduce the leakage flux.

In this manner, maximum channelling of the magnetic flux is ensured, thereby avoiding stray flux and improving motor performance from the standpoint of both torque and temperature rise.

In accordance with another feature of the invention, the rotor is rigidly united with the shaft, either directly or through the medium of a plastic or light-alloy moulding made from a casting and bearing a pawl adapted to engage with a ratchet-type eccentric forming a non-return device.

The description which follows with reference to the acompanying non-limitative exemplary drawings will give a clear understanding of how the invention can be carried into practice.

In the drawings:

FIG. 5 is a diametrical section taken through the magnetic field core of the motor of FIG. 4.

Figure 1:
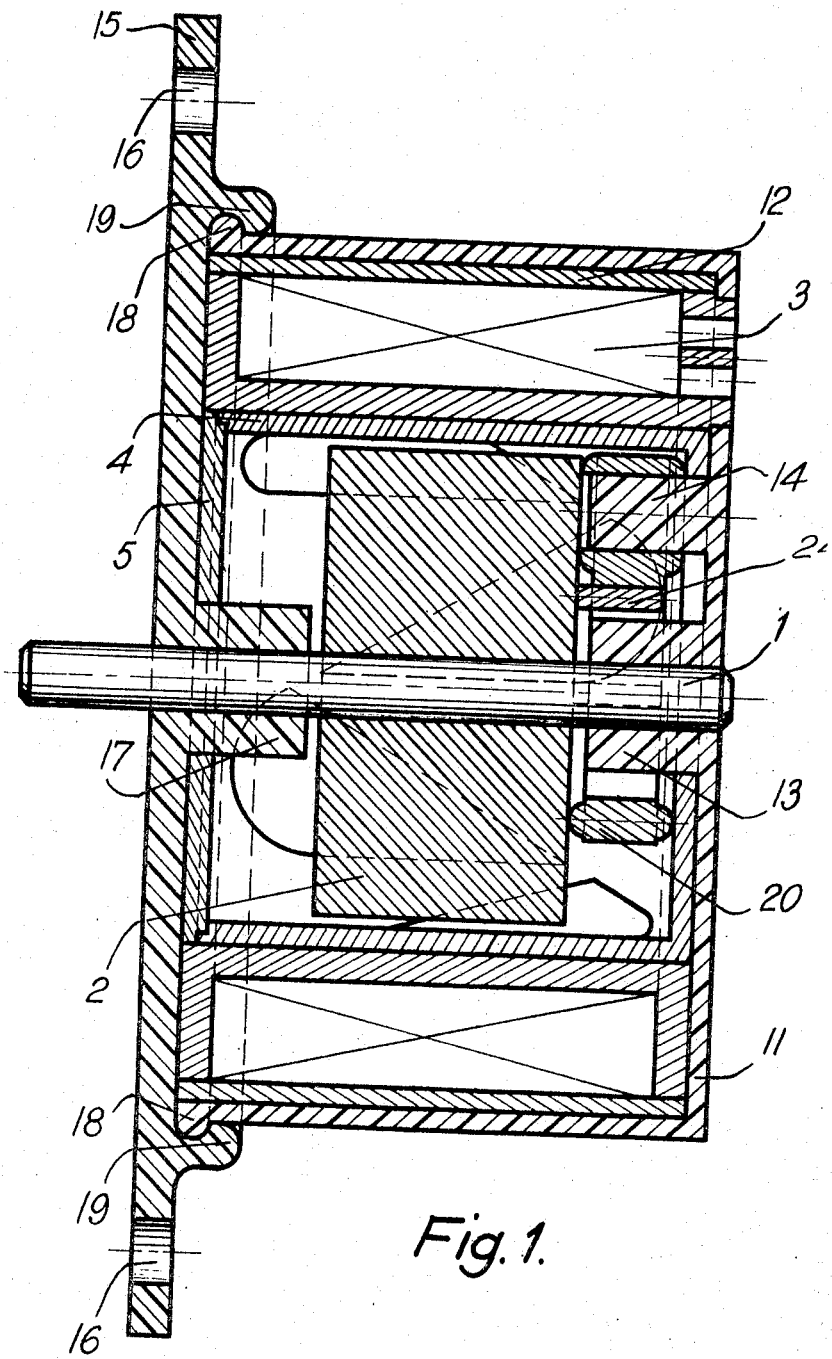
FIG. 1 is a section of a motor according to the invention taken through the diametrical plane passing through the suspension axis of the ratchet-type eccentric acting as a non-return device.
Figure 2:
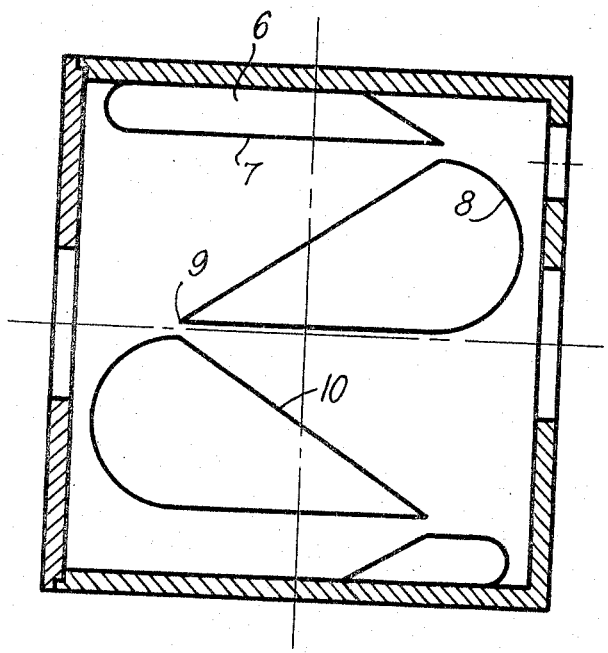
FIG. 2 is a diametrical section through the magnetic field core of the motor of FIG. 1.

Referring first to the constructional form shown in FIGS. 1 and 2, the motor shown thereon comprises a shaft 1 onto which is force-fitted a rotor 2 consisting of a toroidally-shaped permanent magnet. Preferably, this rotor is made of barium ferrite and phenol resin which makes the ferrite less brittle and thus enables the shaft 1 to be driven into the rotor 2.

The stator is comprised of one or more annular field windings 3 and a magnetic core fitted thereinto and having a hollow cylindrical part 4 obturated by a cover 5.

The hollow cylindrical part 4 has formed in its cylindrical wall a series of scalene right-angle-triangle-shaped openings, which are successively inverted along this wall. The longer side 7 which includes the right angle of each of these triangles is parallel with the shaft 1 and its length is substantially equal to the width of the rotor-magnet 2. Each of these triangles terminates in a circular arcuate portion 8 opposite its acutest corner 9, and this corner is positioned close to the hypotenuse 10 of the adjacent triangle. The compound 4, 5 formed thus fulfils the function of pole-pieces and permits of eliminating all backlash in the fitting of the magnetic field core, of ensuring small differences in reluctance between the poles and of notably reducing the stator impedance.

The assembly comprising the shaft 1, the magnet 2, the magnetic core 4, 5 and the winding 3 is inserted into a cowl-forming hollow cylinder 11 consisting of a plastic moulding the inner cylindrical wall of which has applied thereagainst a mild steel tube 12 for reducing the leakage flux. The cowl embodies a moulded-on bearing 13 permitting the shaft 1 to rotate with minimum friction, and also a peg 14 penetrating into the motor in the direction of the rotor. The cowl 11 is closed by a web-like plastic moulding 15 embodying fixing holes 16 and a boss 17 forming a minimum-friction bearing for the shaft 1. The web 15 is made rigid with the cowl 11 through the engagement of a circular rib 18 on the cowl with a circular groove formed in a rib 19 integral with the web.

The non-return device consists of an eccentric 20 which is drilled as at 21 for pivoting about the peg 14 of the cowl 11 and which has formed therein an opening 22 through which pass the shaft 1 and the bearing 13, and said opening is formed with a ratchet tooth 23 adapted to engage with a pawl 24 rigid with the rotor-magnet 2.

Figure 3:
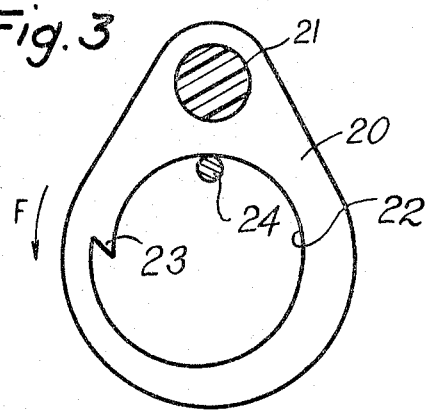
FIG. 3 is a cross-section through the non-return ratchet-type eccentric mounted in the motor of FIG. 1.

The device hereinbefore described functions in the following manner:

If on energizing the conductive winding 3, the motor tends to start in the direction of the arrow F (see FIG. 3) its rotation will not be hindered since the pawl 24 will revolve within the opening 22 without being arrested by the ratchet tooth 23. Conversely, if the motor tends to start in the opposite direction to the arrow F, the pawl 24 will be imprisoned by the ratchet tooth and the ensuing shock will repel it in the direction of the arrow F.

On-load motor starting takes place because the cylindrical part 4 of the magnetic core is rendered asymmetrical by the asymmetrically cut teeth.

Figure 4:
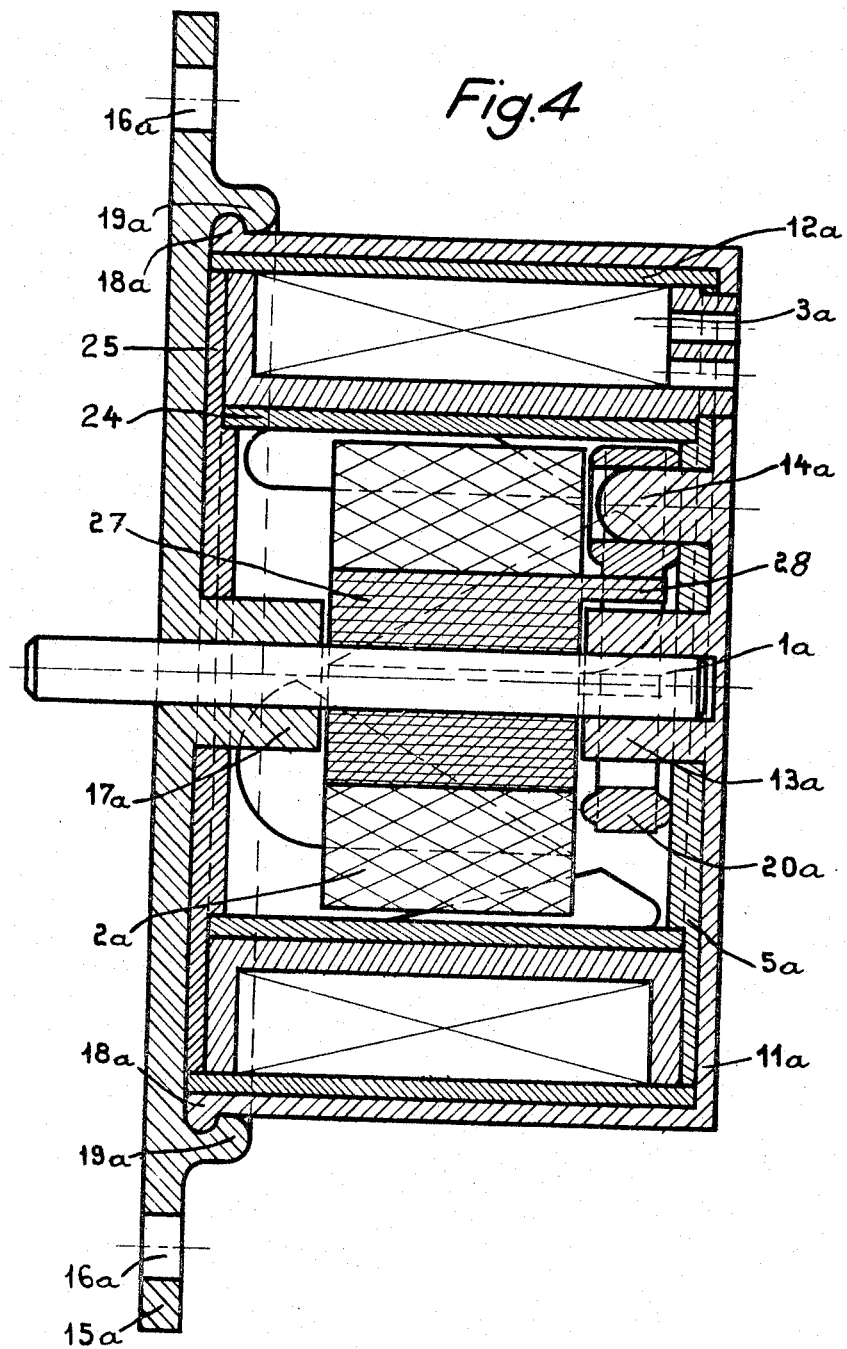
FIG. 4 is a sectional view similar to that of FIG. 1 of an alternative embodiment of a motor according to the invention.

Referring next to FIGS. 4 and 5, in which like parts to those of FIGS. 1 and 2 bear like reference numerals followed by the letter *a* and need not therefore be described anew, the constructional form shown thereon differs from FIGS. 1 and 2 in the design of the magnetic field core, in the manner of mounting the rotor on the drive shaft and in the design of the pawl engaging the ratchet-eccentric.

The magnetic field core in FIGS. 4 and 5 consists of a tube 24 in which are formed successively inverted scalene right-angle-triangle-shaped openings 6a and the extremities of which are closed by two covers 25 and 25a. These covers project beyond the cylindrical part 24 and contact the inner wall of the mild steel tube 12a forming the inner wall of the cowl 11a. This ensures maximum channelling of the magnetic flux, thereby avoiding stray flux and improving motor performance from the standpoint of both torque and temperature rise. The covers 25 and 25a are both provided with holes 26 and 26a for passage of the bearings 13a, 17a and the peg 14a, whereby the magnetic core may be assembled without the need to choose the direction of fitting.

Instead of being mounted directly on the shaft 1a, the rotor or magnet 2a is mounted on a plastic or light alloy moulding 27 made from a casting and moulded on said shaft. Integral with this moulding are one or two pawls 28 fulfilling the function of the pawl in FIGS. 1 and 2 and adapted to engage with the non-return eccentric device 20a.

It will, of course, be understood that many modifications and substitutions of parts may be made in the specific forms of embodiment described hereinbefore without departing from the scope of the invention. By way of example, the cowl, and the web for closing the same, may be made of metal, the cowl being in mild steel and the web being a metal casting, in which case the bearings for the motor shaft would be equipped with self-lubricating bushes or anti-friction bearings. Similarly, the non-return device could be a pinion-type reversing mechanism or the like.

What I claim is:

1. In an on-load self-starting synchronous motor of the kind comprising a rotor carried by the motor shaft and consisting of a toroidally-shaped permanent magnet having alternating north and south poles along its perimeter, and a stator with one or more circular windings within which fits an asymmetrical magnetic core fulfilling the function of pole-pieces, said rotor and stator being housed in a cowl closed by a web while said motor shaft is supported by bearings on said cowl and web; the improvement comprising an asymmetrical magnetic core consisting of a tubular element having formed in its cylindrical wall a series of identical, successively inverted, scalene right-angle-triangle-shaped openings of which the longer of the two sides including the right angle is parallel with the motor shaft and has a length substantially equal to the width of the rotor, each triangle terminating in a circular arcuate portion opposite its acutest corner, which portion is positioned close to the hypotenuse of the adjacent triangle.

2. A motor according to claim 1, wherein said magnet is made of barium ferrite and phenol resin.

3. A motor according to claim 1, wherein the cowl and the web are both made of metal and wherein anti-friction bearings for supporting the motor shaft are respectively mounted in said cowl and said web.

4. A motor according to claim 1, wherein said tubular element consists of a hollow cylindrical part and a cover obturating said part.

5. A motor according to claim 1, wherein the cowl and the web are both made of a moulded plastic material, said cowl having an inner cylindrical wall, a mild steel tube being applied against said inner cylindrical wall for reducing the leakage flux.

6. A motor according to claim 5, wherein said tubular element consists of a tube and two covers closing the extremities of said tube and contacting said mild steel tube.

7. A motor according to claim 5, wherein said cowl and said web are rendered mutually rigid by the mutual engagement of circular ribs formed thereon.

8. A motor according to claim 1, wherein said non-return system consists of a pinion-type reversing mechanism.

9. A motor according to claim 1, wherein said non-return system consists of a ratchet-type eccentric mechanism.

10. A motor according to claim 9, wherein the cowl is formed with an internal peg and wherein said ratchet-type eccentric mechanism comprises a ratchet-type eccentric mounted on said peg and having formed therein an opening which surrounds the motor shaft and its bearings, the contour of said opening embodying a ratchet tooth, and a pawl rigid with the rotor and adapted to engage said ratchet tooth.

11. A motor according to claim 1, wherein the motor shaft carries a moulding on which the rotor is fitted.

12. A motor according to claim 11, wherein the cowl is formed with an internal peg and wherein the non-return system comprises a ratchet-type eccentric mounted on said peg and having formed therein an opening which surrounds the motor shaft and its bearings, the contour of said opening embodying a ratchet tooth, and a pawl integral with said moulding and adapted to engage said ratchet tooth.

References Cited by the Examiner

UNITED STATES PATENTS

| | | | |
|---|---|---|---|
| 3,032,670 | 5/1962 | Fritz | 310—164 |
| 3,119,941 | 1/1964 | Guiot | 310—156 |

MILTON O. HIRSHFIELD, *Primary Examiner.*

L. L. SMITH, *Assistant Examiner.*